July 12, 1949.　　　　G. J. ELTZ　　　　2,475,598

MEANS FOR DETERMINING RANGE

Filed Feb. 25, 1943

INVENTOR.
GEORGE J. ELTZ
BY
William D. Hall
Attorney

Patented July 12, 1949

2,475,598

UNITED STATES PATENT OFFICE 2,475,598

MEANS FOR DETERMINING RANGE

George J. Eltz, Avon, N. J.

Application February 25, 1943, Serial No. 477,104

4 Claims. (Cl. 343—1.3)

(Granted under the act of March 3, 1883, as amended April 30, 1928; 370 O. G. 757)

The invention described herein may be manufactured and used by or for the Government for governmental purposes, without the payment to me of any royalty thereon.

My present inventiton has to do with range-indicating devices. More particularly, it relates to apparatus for determining and visually indicating the distance between an object such as an aircraft and a detecting station.

Range indicating apparatus, as used in the so-called pulse-echo radio system of object detection, usually includes an oscilloscope. The oscilloscope is employed as part of an assembly of apparatus the function of which is the measurement of the time intervening between the transmission into space of pulses of high frequency energy and the reception, back at the detecting station, of any echo or reflection thereof, said elapsed time representing a phase displacement and constituting the basis for calculating the range of the object producing the echo. Obviously such an assembly of apparatus must function with extreme precision or else error will be introduced into the calculation of the range. An oscilloscope is a delicate piece of equipment and vibrations, such as are set up by concussion resulting from gun fire and the like, seriously impair the proper functioning thereof.

It is to the elimination of this source of error in calculating range that the present invention is addressed. The present invention provides, in combination with a pulse-echo radio system of object detection, an electro-mechanical range indicating device which is sturdy in construction and therefore capable of withstanding the violent disturbances of the character to which I have referred.

This desirable result is attained by the provision of a rigidly mounted shutter mechanism housing a source of light and adapted to scan a rigidly mounted distance-calibrated scale in synchronism with the transmission of the pulses of high frequency energy, said source of light being excited by said pulses and, in addition, by any echoes thereof, and said shutter permitting illumination of said scale at successive points corresponding to the time intervals between said pulse and echo excitations.

Other objects and advantages of the present invention will readily occur to those skilled in the art to which the same relates as the following detailed description thereof progresses.

Figure 2:
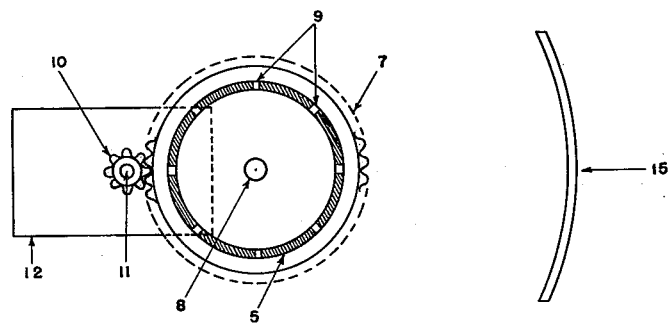
Figure 1:
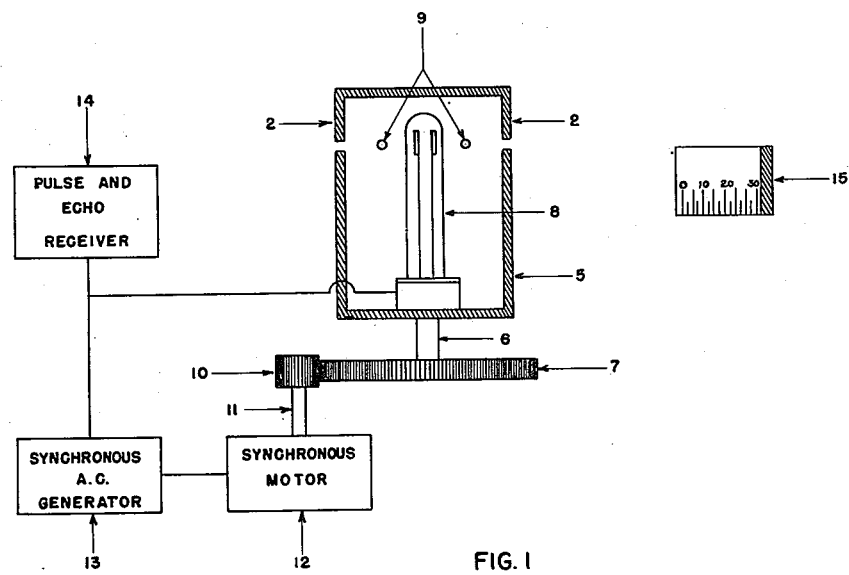

In the accompanying specification I describe, and in the annexed drawing I show an illustrative embodiment of the range indicating means of the present invention, and in said drawing:

Figure 1 is a partial schematic, partial sectional view of a range indicating system assembled in accordance with the principles of the present invention; and Figure 2 is a transverse sectional view taken along line 2—2 of Figure 1.

Referring now more in detail to the present invention with particular reference to the drawing, the numeral 5 designates a shutter comprising a metallic cylindrical shell fixed upon one end of a shaft 6, the other end of which carries a gear 7.

Housed within the shell is a source of light 8, such as a neon bulb, and formed in the walls of the shell, in alignment with the light-generating elements of the bulb, are a plurality of uniformly spaced openings 9.

In mesh with the gear 7 is a pinion 10 fixed upon the outer end of a shaft 11 of a synchronous motor 12, the latter obtaining its driving power from a generator 13 consisting of a conventional vacuum tube circuit for converting sharp pulses of electrical energy into a sine wave current of the same frequency.

These pulses are preferably obtained from the ouput of a radio receiver 14 constituting a component of the above referred to pulse-echo system of object detection.

In such a system the pulses of high frequency energy are directionally radiated into space at an audio frequency rate dependent upon the desired maximum effective range of the system. For example, if it is desired to detect the presence of objects witihn a range of 200 miles of the detecting station it is necessary to employ a pulse frequency of not more than 465 C. P. S., corresponding to 2150 microseconds, sufficient time to permit each pulse to travel outwardly the maximum range of the system and be reflected by any object within the range thereof before the transmission of the next pulse.

As previously stated, the time elapsing between the original pulse transmission and the reception of any echo thereof constitutes a phase displacement which is measured to calculate the range of the object causing the echo and ordinarily this measurement is accomplished by means of an oscilloscope apppropriately connected into the system.

In the present invention this elapsed time or phase displacement is determined by the use of a stroboscopic effect. The original pulses and any echoes thereof, after detection by the receiver 14, are fed to the neon bulb 8 to excite the latter in synchronism therewith. The output of the receiver is also fed, as above indicated, to a conventional vacuum tube circuit for converting the originally transmitted pulses into a sine wave current. The tube of this circuit is operated class C and requires considerable drive to overcome the bias thereon. The amplitude of the original pulse transmission is sufficient to overcome the bias but the amplitude of the echo is not. Therefore only the original pulse will appear in the output of the circuit and as this pulse is converted to a sine wave the echo is clipped. The alternating current so obtained actuates the synchronous motor 12 and the latter, through appropriate gearing (pinion 10 and gear 7), rotates the shell 5 and the neon bulb 8 carried thereby at such speed as to cause each opening 9 in the shell to scan a scale 15 in 2150 microseconds, in other words, in synchronism with the pulse frequency.

The scale 15 is calibrated in terms of distance corresponding to the range of the system and is of convenient physical size to permit the easy reading thereof. This size depends upon the number of openings in the shell 5 and the radial distance between the neon bulb 8 and the scale. For example, if the shell is provided with 8 openings, as is shown herein, each opening must scan 45° of arc in 2150 microseconds and if the scale, the length of which must correspond to said 45° of arc, is spaced 24 inches from the neon bulb it will have to be just under 19 inches in length to permit the end of the scan by one opening in the shell to coincide with the start of the scan by the succeeding opening. I have found that a scale of this size is sufficient to satisfy the requirements of the assumed system. In order to obtain synchronism between the pulse frequency and the scanning by the shutter or shell, the latter, having 8 openings therein, will have to rotate at approximately 3486 R. P. M. and the synchronous motor 12 and the gearing 7—10 is designed accordingly.

Obviously, if the neon bulb is actuated by the originally transmitted pulses at the instant when each opening in the shutter is commencing its scan, corresponding to the zero point on the scale, any echo from an object within the range of the system will again excite the bulb at some time during each scan so as to cause a spot of light to fall upon the scale at the appropriate indication of the range of the particular object.

It will thus be noted that I have presented an accurate range indicating device so constructed as to withstand the concussion effects of gun fire, thereby avoiding the disadvantages resulting from the use of delicate equipment, such as the oscilloscope, for like purposes. It is, however, to be clearly understood that I do not wish to be limited to the exact details of construction herein shown and described for purposes of illustration only, inasmuch as changes therein may be made within the scope of the claims hereto appended.

I claim:

1. In combination with a pulse-echo system of object detection, range-indicating means comprising, a source of light made intermittently effective in synchronism with the pulse transmission of said system and any echoes thereof, a scale calibrated in terms of distance, a shutter intermediate said source of light and said scale adapted periodically to scan the latter and permit illumination thereof at successive points corresponding to the time intervals between said excitations, means to convert a portion of the energy of the originally transmitted pulses to a sine wave current, and means actuated by the current so obtained to synchronize the scanning of said scale by said shutter with the pulse transmission.

2. In combination with a pulse-echo system of object detection, range-indicating means comprising, a source of light made intermittently effective in synchronism with the pulse transmission of said system and any echoes thereof, a scale calibrated in terms of distance, an apertured housing for said source of light rotatably mounted adjacent said scale adapted periodically to scan the latter and permit illumination thereof at successive points corresponding to the time intervals between said excitations, means to convert a portion of the energy of the originally transmitted pulses to a sine wave current, and means actuated by the current so obtained to synchronize the scanning of said scale by said housing with the pulse transmission.

3. In combination with a pulse-echo system of object detection, range-indicating means comprising, a source of light made intermittently effective in synchronism with the pulse transmission of said system and any echoes thereof, a scale calibrated in terms of distance, a shutter intermediate said source of light and said scale adapted periodically to scan the latter and permit illumination thereof at successive points corresponding to the time intervals between said excitations, means to convert a portion of the energy of the originally transmitted pulses to a sine wave current, and a synchronous motor actuated by the current so obtained coupled to said shutter to synchronize the scanning of said scale by said shutter with the pulse transmission.

4. In combination with a pulse-echo system of object detection, range-indicating means comprising, a source of light made intermittently effective in synchronism with the pulse transmission of said system and any echoes thereof, a scale calibrated in terms of distance, an apertured housing for said source of light rotatably mounted adjacent said scale adapted periodically to scan the latter and permit illumination thereof at successive points corresponding to the time intervals between said excitations, means to convert a portion of the energy of the originally transmitted pulses to a sine wave current, and a synchronous motor actuated by the current so obtained coupled to said housing to synchronize the scanning of said scale by said housing with the pulse transmission.

GEORGE J. ELTZ.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 1,977,875 | Donaldson | Oct. 23, 1934 |
| 2,098,287 | Gent | Nov. 9, 1937 |
| 2,232,096 | Dane | Feb. 18, 1941 |